(12) United States Patent
Ni et al.

(10) Patent No.: US 9,085,087 B2
(45) Date of Patent: Jul. 21, 2015

(54) PALM JIG SAW

(71) Applicant: Chervon (HK) Limited, Wanchai (HK)

(72) Inventors: Guigong Ni, Nanjing (CN); Ping Wang, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 243 days.

(21) Appl. No.: 13/708,190

(22) Filed: Dec. 7, 2012

(65) Prior Publication Data

US 2013/0145632 A1    Jun. 13, 2013

(30) Foreign Application Priority Data

Dec. 7, 2011   (CN) ................... 2011 2 0504495 U
Jan. 6, 2012   (CN) ..................... 2012 1 0003076

(51) Int. Cl.
*B23D 49/16*    (2006.01)
*B27B 19/09*    (2006.01)
*B25F 5/02*     (2006.01)

(52) U.S. Cl.
CPC .............. *B27B 19/09* (2013.01); *B23D 49/162* (2013.01); *B23D 49/165* (2013.01); *B23D 49/167* (2013.01); *B25F 5/02* (2013.01)

(58) Field of Classification Search
CPC ... B23D 49/162; B23D 49/165; B23D 49/167
USPC ..................... 30/388–391, 392–394
See application file for complete search history.

(56) References Cited

U.S. PATENT DOCUMENTS

| 6,185,826 | B1 * | 2/2001 | Lutz et al. ..................... 30/277.4 |
| 7,513,047 | B2 * | 4/2009 | Wu ................................ 30/392 |
| 2004/0035009 | A1 * | 2/2004 | Richards ......................... 30/381 |
| 2010/0031517 | A1 * | 2/2010 | Fukinuki et al. ................. 30/374 |
| 2010/0281697 | A1 * | 11/2010 | Tate et al. ....................... 30/312 |
| 2011/0107608 | A1 * | 5/2011 | Wattenbach et al. ............ 30/394 |
| 2011/0273117 | A1 * | 11/2011 | Nakamura et al. ............. 318/139 |
| 2012/0192438 | A1 * | 8/2012 | Aoki et al. ........................ 30/392 |
| 2012/0317823 | A1 * | 12/2012 | Vantran et al. .................. 30/376 |
| 2013/0081286 | A1 * | 4/2013 | Moreno .......................... 30/377 |
| 2013/0160304 | A1 * | 6/2013 | Tate ................................ 30/381 |
| 2013/0227845 | A1 * | 9/2013 | Fujiwara ........................ 30/394 |
| 2014/0215839 | A1 * | 8/2014 | Abe et al. ........................ 30/388 |

* cited by examiner

*Primary Examiner* — Ned Landrum
*Assistant Examiner* — Richard Crosby, Jr.
(74) *Attorney, Agent, or Firm* — Greenberg Traurig, LLP

(57) ABSTRACT

A palm jig saw includes a motor, a transmission mechanism connected to an output shaft of the motor, and an implementing element which is driven by the transmission mechanism and which movement trajectory is in the same plane called a swing plane. The palm jig saw further includes a switch locking structure including a push button assembly and a press button assembly, wherein a movement direction of the push button assembly is generally parallel to the swing plane, and a movement direction of the press button assembly is generally perpendicular to the swing plane.

18 Claims, 3 Drawing Sheets

PALM JIG SAW

RELATED APPLICATION DATA

This application claims the benefit of CN 201210003076.0, filed on Jan. 6, 2012, and CN 201120504495.3, filed on Dec. 7, 2011, the disclosures of which are incorporated herein by reference in their entirety.

BACKGROUND

This disclosure generally relates to a palm power tool and, more particularly, to a palm jig saw.

Palm power tools refer to small power tools using electrical power as a power source and being hand-held by an operator to perform a certain function. In the prior art, palm power tools usually employ two manners to trigger a switch: one is that a finger presses a switch or its accessory structure to move the switch to an "on" state, and when the finger removes, the switch automatically moves to an "off" state. The other mode involves a switch structure having a self-locking function so that the switch is triggered by pressing a button of the switch and the button will not automatically eject after the finger moves away. As such, the switch remains in the "on" state, and it will return to an "off" state when the button of the switch is pressed again. Currently, there is not a switch structure which exhibits operability and convenience and can switch on or switch off an appliance timely to achieve various benefits thereby. Furthermore, the current switch structures usually cannot provide a relatively comfortable operation experience.

SUMMARY

In order to overcome the drawbacks in the prior art, an object of the present invention is to provide a palm jig saw which exhibits operability and convenience and can switch on or switch off a switch locking structure of an appliance timely.

A palm jig saw comprises a housing adapted for palm gripping comprising a first side wall and a second side wall opposite to the first side wall, the first and second side walls respectively define a first recess and a second recess for gripping. A base is connected to the housing for contacting with a workpiece and supporting the palm jig saw. A motor having an output shaft is arranged within the housing, the output shaft is generally parallel to the base. A transmission mechanism is connected to the output shaft of the motor which comprises a slide bar, the slide bar is capable of moving in a direction generally perpendicular to the output of the motor. An implementing element is connected to the slide bar, which is driven by the transmission mechanism to move in a swing plane. A battery pack for powering the motor is inserted into the housing, an inserting direction of the battery pack is generally parallel to the output shaft of the motor, the battery pack is positioned between the motor and the base and partially overlaps with the motor in a direction perpendicular to the base. A switch locking structure comprises a push button assembly and a press button assembly, the push button assembly and the press button assembly are positioned adjacent to the first and second recess respectively, the push button assembly is capable of moving in a first direction which is parallel to the swing plane, the press button assembly is capable of moving in a second direction which is perpendicular to the swing plane.

The switch locking structure of the present invention is advantageous in that it has a self-locking and an anti-self-locking function. The push button assembly and the press button assembly are respectively positioned adjacent to the first and second recess for gripping. Thereby the palm jig saw is adapted for the user's single hand operation, exhibits operability and convenience, can switch on or switch off the appliance timely, and can provide a relatively comfortable operation experience for the user.

DETAILED DESCRIPTION

The present invention will be described in detail with reference to figures and exemplary embodiments.

Figure 1:
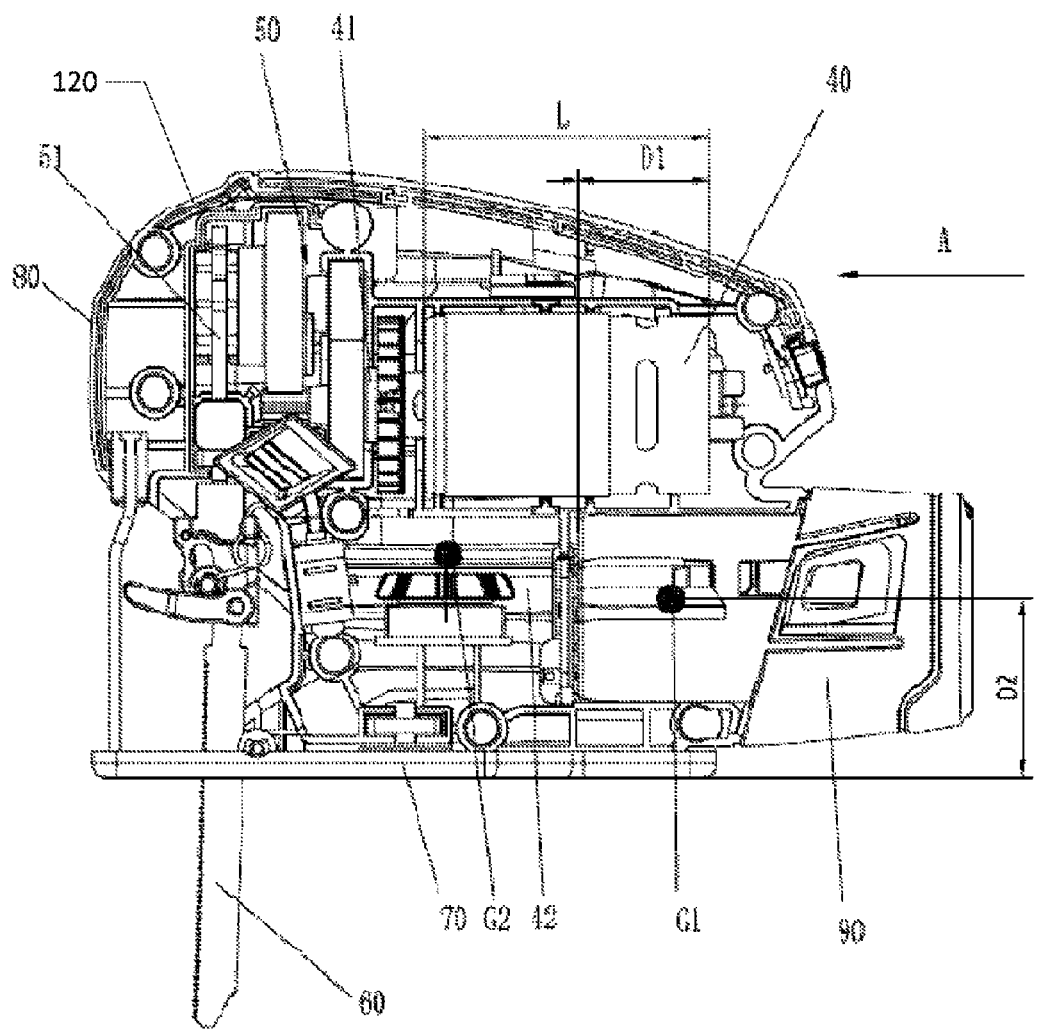
FIG. 1 is a schematic view showing internal structure of an exemplary palm jig saw, wherein an arrow A is provided to indicate an inserting direction of a battery pack.

Referring to FIG. 1, a palm jig saw according to the present invention includes a motor 40, a transmission mechanism 50 coupled to an output shaft 41 of the motor 40, an implementing element 60, a base 70, a housing 80 and a battery pack 90.

The motor 40 converts the electrical energy of the battery pack 90 into mechanical power, the transmission mechanism 50 transmits the mechanical power output by the output shaft 41 of the motor 40 to the implementing element 60 to enable the implementing element 60 to make a regular movement to achieve the function of a jig saw or the like. The implementing element 60 is a member performing a specific function such as bore drilling or sawing. An electric component 42 is capable of providing electrical power of the battery pack 90 to the motor 40 and controlling operation of the palm jig saw. The base 70 is connected to the housing 80 so as to support the palm jig saw and provide a plane in contact with a workpiece to be processed. The housing 80 is used to fix and protect the internal structures of the palm jig saw and includes a gripping structure formed on an outer portion for ease of gripping. The battery pack 90 is used to provide electrical power.

The implementing element 60 is coupled to the transmission mechanism 50, the implementing element 60 is configured to be driven by the transmission mechanism 50 to move regularly to a perform cutting operation or the like. Noticeably, a movement trajectory of the implementing element 60 is in a plane which is called a swing plane. The movement trajectory of the implementing element 60 refers to a trajectory formed by a particular point selected on the implementing element 60 during movement of the implementing element 60. Considering the implementing element 60 is a jig saw blade or like rigid member, the movement trajectory of the above particular point can represent a movement situation of the jig saw as a whole.

Figure 2:
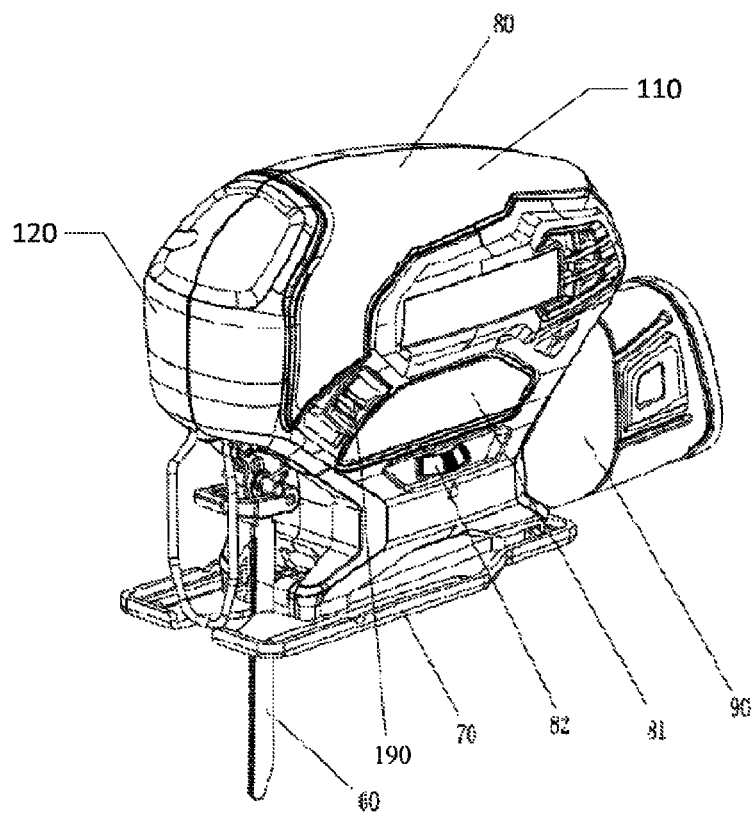
FIG. 2 is a perspective structural schematic view of the external of the embodiment shown in FIG. 1.

As shown in FIG. 1 and FIG. 2, the transmission mechanism 50 includes a slide bar 51 for driving the jig saw blade and the slide bar 51 moves in a direction perpendicular to the output shaft 41 of the motor 40, i.e., perpendicular to an insertion direction of the battery pack 90 as shown by the arrow A. Two sides of the jig saw blade are parallel to the output shaft 41 of the motor 40, i.e., the jig saw blade is intended to travel in a direction perpendicular to the insertion direction A of the battery pack 90 during operation.

As shown in FIG. 1, the output shaft 41 of the motor 40 is connected to the transmission mechanism 50, the transmission mechanism 50 is connected to the implementing element 60 and drives it to work. The base 70 is positioned on the bottom of the housing 80, and the battery pack 90 is inserted into the housing 80 in a direction parallel to the output shaft 41 of the motor 40, that is, the direction indicated by the arrow A in FIG. 1.

The motor 40 and the electric component 42 are both disposed in the housing 80, and the transmission mechanism 50 and the battery pack 90 are partially positioned in the housing 80. When the palm jig saw is in a state shown in FIG. 1, the vertical direction defines a height direction of the palm jig saw and the horizontal direction defines a lengthwise direction of the palm jig saw. When viewed in the lengthwise direction, the battery pack 90 is partially located outside the housing 80, partially located inside the housing 80, and partially overlaps the motor 40 in the height direction. The motor 40 has a length L. An overlap area D1 of the motor 40 and the battery pack 90 is at least 1/10 of the length L of the motor 40. Preferably, the overlap area D1 is 1/2 of the length of the motor 40. Such an arrangement reduces the dimension of the palm jig saw in the lengthwise direction. When viewed in the height direction, the battery pack 90 is located between the motor 40 and the base 70. The battery pack 90 has a center of gravity G1 A distance D2 between the center of gravity G1 of the battery pack 90 and the base 70 is in a range from 20 mm to 50 mm. Preferably, the distance D2 is 35 mm. The center of gravity G1 is also adjacent to the base 70 such that a center of gravity G2 of the palm electric tool is lowered. Thus the dimension of the electric tool in height direction is reduced, and the palm electric tool is easy to control.

Preferably, a profile of the battery pack 90 is designed in a way that the lengthwise direction of the battery pack 90, that is, the direction of the battery pack 90 having the longest horizontal dimension, should be parallel to the output shaft 41 of the motor 40. That is to say, the lengthwise extension direction of the battery pack 90 is generally parallel to the direction of the output shaft 41 of the motor 40.

Preferably, as shown in FIGS. 1 and 2, the housing 80 includes a first side wall 110 and a second side wall 120 opposite to the first side wall 110. The first side wall 110 and the second side wall 120 respectively define a first recess 81 and a second recess (not shown) for gripping by a user. The second recess is opposite to the first recess 81 and has substantially the same shape as the first recess 81. The first recess 81 is adapted for placing the thumb of the user and the second recess is adapted for placing the other four fingers of the user. A top portion of the housing 80 arches to adapt for the user's palm shape so that the user's four fingers grip the second recess on the second side wall 120 and the thumb grips the first recess 81 on the first side wall 110 so as to hold the jig saw. A lengthwise direction of the outline of the first recess 81, namely, the direction of the first recess 81 having the longest horizontal dimension is parallel to the output shaft 41 of the motor 40. When the whole body is held, the user's forearm is generally perpendicular to the output shaft 41 of the motor 40. Such design of the housing 80 highlights that the battery pack 90 functions to lower the center of gravity. Besides, the battery pack 90 does not hinder the user's gripping, nor causes inconvenience due to its dimensions when the user moves the device, and therefore allows for very comfortable operation. For ease of operation, an adjust knob 82 for controlling the speed of the motor 40 is positioned below the first recess 81, so the user's thumb can easily contact the adjust knob 82 for timely controlling the speed of the motor 40.

Figure 3:
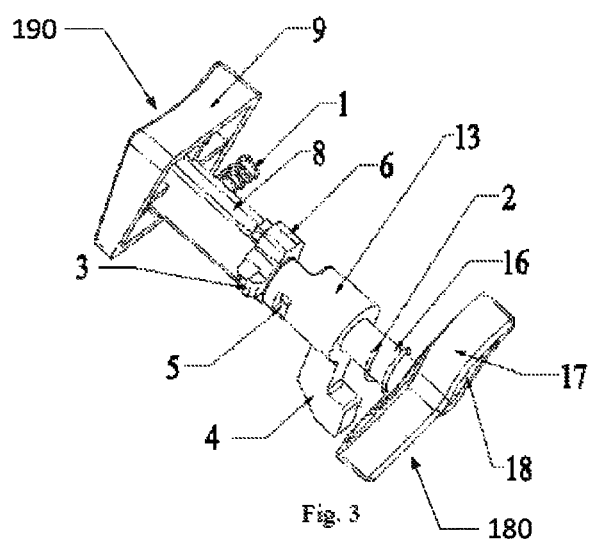
FIG. 3 is a perspective view of a switch locking structure of the palm jig saw according to the present invention.
Figure 4:
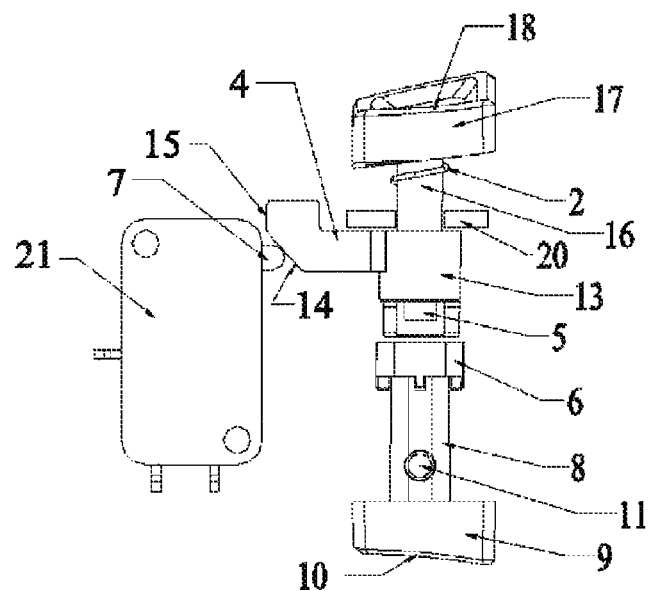
FIG. 4 is a planar schematic view of the switch locking structure shown in FIG. 3.

As shown in FIGS. 3 and 4, the palm jig saw further includes a switch locking structure including a push button assembly 190 and a press button assembly 180. For ease of operation, the push button assembly 190 and the press button assembly 180 are positioned adjacent to the first recess 81 and the second recess respectively, so the user's thumb can easily contact the push button assembly 190 and the other fingers can easily contact the press button assembly 180 for timely controlling the motor 40. The push button assembly 190 is capable of moving in a first direction which is generally parallel to the swing plane of the implementing element 60. The press button assembly 180 is capable of moving in a second direction which is generally perpendicular to the swing plane of the implementing element 60.

The switch locking structure adapted for the palm jig saw according to the described embodiment mainly includes a push button assembly, a press button assembly, a first resilient element 1, and a second resilient element 2.

The first resilient element 1 is assembled with the push button assembly, and the second resilient element 2 is assembled with the press button assembly. A resilient restoring direction of the first resilient element 1 is generally perpendicular to that of the second resilient element 2, that is, the directions of reciprocating movement of the push button assembly and the press button assembly under the action of the first resilient element 1 and the second resilient element 2 are generally perpendicular to each other. The push button assembly is formed with a locking protrusion 3, and the press button assembly is formed with a drive arm 4 and a locking slot 5. When the push button assembly and the press button assembly, under operation of the user, respectively compress the first resilient element 1 and the second resilient element 2, the locking protrusion 3 aligns with the locking slot 5. Whereupon the push button assembly is released, the locking protrusion 3 can be embedded into the locking slot 5 to limit the position of the press button assembly so that the drive arm 4 of the press button assembly keeps triggering a switch 21 to make the palm jig saw in a working state. At this time, even though the press button assembly is released or pressed again, the press button assembly still remains at the original position to ensure the switch 21 to be pressed constantly. In order to ensure stability of the pressing, i.e., ensure the state of the firing trigger of the switch 21, only when the press button assembly is pressed with a hand to a maximum position can the locking protrusion 3 be embedded into the locking slot 5. As such, when the locking protrusion 3 is embedded, the press button assembly is limited at a maximum position to which it can be pressed with the hand. When the push button assembly is not unlocked, the press button assembly will not loosen if it is pressed again because it is already at the maximum position to which it can be pressed with the hand. And conversely, it is limited by the locking protrusion 3. As a preferred solution, a cross-sectional shape of the locking protrusion 3 should be formed as a trapezoid shape as shown in FIG. 4. A bottom edge of the trapezoid is used for contacting a slot wall of the locking slot 5 to limit it from restoring under action of the second resilient element 2.

Figure 5:
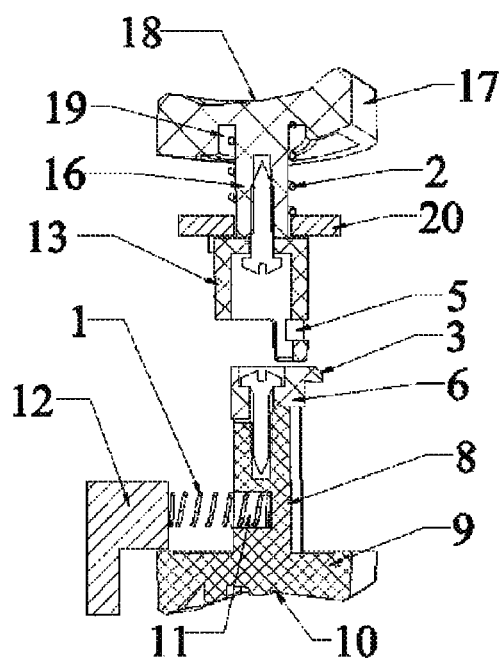
FIG. 5 is a cross-sectional view of the switch locking structure shown in FIG. 4.

As shown in FIG. 5, the first resilient element 1 and the second resilient element 2 may employ a helical spring.

As a preferred solution, the push button assembly employs the following technical solution:

The push button assembly includes a push button and a locking block 6, wherein the push button includes two integrally formed portions: a push button cap 9 and a push button linkage 8. The locking block 6 is formed with the locking protrusion 3, the push button linkage 8 is formed with a placement opening 11 for receiving and fixing one end of the first resilient element 1, the push button cap 9 is formed at one end of the push button linkage 8, and the other end of the push button linkage 8 is fixedly connected to the locking block 6. On an outer surface of the push button cap 9 is formed a recessed push button contact surface 10 to help the user to operate on it.

As a preferred solution, the locking block 6 is threadedly connected to the push button linkage 8; besides, in order to enable the push button linkage 8 to effectively bring the locking block 6 into motion, the locking block 6 and the push button linkage 8 are provided with mating steps at the connection to effectively transfer a torque.

As a preferred solution, the structure further includes a push button stopper 12 fixedly connected to a machine body of the palm jig saw and functioning to fix the other end of the first resilient element 1 so that when the push button assembly moves, it compresses the first resilient element 1. Certainly, the other end of the first resilient element 1 can also be fixed to other structures or members fixedly connected to the machine body of the palm jig saw, namely structures or members fixed relative to the whole hand-held power tool. In the present embodiment, the first resilient element 1 employs a helical spring which one end is fixed in the placement slot opening 11, and the other end is fixedly connected to the push button stopper 12.

As a preferred solution, the press button assembly employs the following technical solution:

The press button assembly includes a press button and a drive block 13, wherein the press button includes two integrally formed portions: a press button cap 17 and a press button linkage 16. The drive block 13 is formed with a locking slot 5 and a drive arm 4. The press button cap 17 is formed at one end of the press button linkage 16, and the other end of the press button linkage 16 is fixedly connected to the drive block 13. On an outer surface of the press button cap 17 is formed a press button contact surface 18, and inside the press button cap is formed a press button groove 19 for receiving the second resilient element 2.

As shown in FIGS. 4 and 5, the drive block 13 may employ a hollow sleeve structure which one end extends to form a semi-circumferential projection, then the locking slot 5 is formed on the projection, a side wall of the drive block 13 extends outwardly to form the drive arm 4, the drive arm 4 is formed with a contact ramp 14 and a contact plane 15 which are contiguous to each other. The contact ramp 14 functions to gradually press the firing trigger 7 or gradually retreat out of a state of pressing the firing trigger 7 when the drive block 13 moves; the contact plane 15 provides a plane for stably pressing the firing trigger 7 to ensure the working state of the hand-held power tool switch 21.

In addition, the structure further includes: a press button baffle 20 fixedly connected to the hand-held power tool machine body and provided with a through hole. Preferably, as stated above, the second resilient element 2 is a helical spring disposed around the press button linkage 16. One end of the second resilient element 2 is fixed in the press button groove 19 which is an annular groove, and the other end thereof is fixed on outside of the press button baffle 20, and certainly may also be fixed to other structures or members fixedly connected to the machine body of the palm jig saw, namely, structures or members fixed relative to the palm jig saw. As such, supported by the press button baffle 20, the second resilient element 2 can provide a return resilient force for the press button cap 17. This is only one embodiment. The second resilient element 2 may be connected to the press button assembly in other manners and enabled to have a return resilient force.

As a preferred solution, the press button linkage 16 is threadedly connected to the drive block 3.

Referring to the above embodiments, an operating procedure of the present invention is briefly described as follows. Take the firing trigger being pressed to switch on the power tool as an example. When the palm jig saw is not in use, the switch locking structure adapted for the palm jig saw of the present invention is in a state shown in FIG. 4, whereupon the push button cap 9 is pushed to the left (for ease of description, directions are as shown in FIG. 4), the first resilient element 1 is compressed, meanwhile the press button cap 18 is pressed to trigger the firing trigger 7 under action of the drive arm 4, whereupon the locking protrusion 3 aligns with the locking slot 5, the push button cap 9 is released to enable the first resilient element 1 to return, the locking protrusion 3 is embedded into the locking slot 5. At this time, if the press button cap 17 is released or pressed, the press button assembly will not displace and is in a locked state, thereby reducing the user's fatigue and preventing accidental operation. When the palm jig saw needs to be switched off upon completion of operation, the push button cap 10 is pushed to the left again, but the press button cap 18 is not pressed so that it returns under action of the second resilient element 2, and the drive arm 4 releases the firing trigger 7 to stop operation. As such, the switch locking structure returns to the state shown in FIG. 3.

Noticeably, a gap between the drive block 13 and the locking block 6 is so small that when the push button cap 9 is not pushed to keep clear a certain position, the press button cap 18 cannot be pressed to enable the drive arm 4 to make sufficient displacement to trigger the firing trigger 7 and prevent accidental operation.

The above embodiments do not limit the present invention in any form. Any technical solutions obtained by equivalent substitution or equivalent transformation fall within the protection scope of the present invention.

What is claimed is:
1. A palm jig saw, comprising:
   a housing adapted for palm gripping comprising a first side wall and a second side wall opposite to the first side wall, the first and second side walls respectively define a first recess and a second recess for gripping;
   a base connected to the housing for contacting with a workpiece and supporting the palm jig saw;
   a motor having an output shaft arranged within the housing, the output shaft being generally parallel to the base;
   a transmission mechanism connected to the output shaft of the motor which comprises a slide bar, the slide bar being capable of moving in a direction generally perpendicular to the output of the motor;
   an implementing element connected to the slide bar, which is driven by the transmission mechanism to move in a swing plane;
   a battery pack for powering the motor inserted into the housing, an inserting direction of the battery pack being generally parallel to the output shaft of the motor, the battery pack being positioned between the motor and the base and partially overlapped with the motor in a direction generally perpendicular to the base; and
   a switch locking structure comprising a push button assembly and a press button assembly, the push button assembly and the press button assembly being positioned adjacent to the first and second recess respectively, the push button assembly being capable of moving in a first direction which is generally parallel to the swing plane, the press button assembly being capable of moving in a second direction which is generally perpendicular to the swing plane, and wherein the switch locking structure further comprises a first resilient element mounted on the push button assembly and a second resilient element mounted on the press button assembly, the first resilient element being positioned generally perpendicular to the second resilient element, the push button assembly and the press button assembly being capable of moving reciprocatingly under the action of the first resilient element and the second resilient element respectively, the push button assembly being formed with a locking protrusion, and the press button assembly being formed with a drive arm for triggering a switch of the palm power tool and a locking slot for embedding the locking protrusion.

2. The palm jig saw according to claim 1, wherein the battery pack has a lengthwise direction generally parallel to the output shaft of the motor.

3. The palm jig saw according to claim 1, wherein the push button assembly comprises a push button and a locking block fixedly connected to the push button, the push button being fixedly connected to one end of the first resilient element, and the locking block being formed with the locking protrusion.

4. The palm jig saw according to claim 3, wherein the push button comprises a push button linkage and a push button cap which are integrated, the push button linkage is fixedly connected to the locking block at one end, the push button cap being located at the other end of the push button linkage, the push button cap being formed with a recessed push button contact surface on an outer surface to facilitate manual operation, the push button linkage being formed with a placement opening for receiving and fixing one end of the first resilient element.

5. The palm jig saw according to claim 4, wherein the press button assembly comprises a press button and a drive block fixedly connected to the press button, the drive block being formed with the locking slot and the drive arm, the drive arm being provided with a contact ramp and a contact plane which are contiguous to each other.

6. The palm jig saw according to claim 5, wherein the press button comprises a press button linkage and a press button cap which are integrated, the press button linkage being fixedly connected to the drive block at one end, the press button cap being located at the other end of the press button linkage, the press button cap is formed with a press button contact surface for facilitating manual contact on an outer surface, the press button cap is formed with a press button groove in an inner surface for receiving the second resilient element, the second resilient element is fixed in the press button groove at one end.

7. The palm jig saw according to claim 6, wherein the drive block is a hollow sleeve structure which extends to form a semi-circumferential projection at one end, the locking slot is formed on the projection, and a side wall of the sleeve structure extends outwardly to form the drive arm.

8. A palm jig saw, comprising:
a housing adapted for palm gripping comprising a first side wall and a second side wall opposite to the first side wall, the first and second side walls respectively define a first recess and a second recess for gripping;
a base connected to the housing for contacting with a workpiece and supporting the palm jig saw;
a motor having an output shaft arranged within the housing;
a transmission mechanism connected to the output shaft of the motor which comprises a slide bar;
an implementing element connected to the slide bar, which is driven by the transmission mechanism to move in a swing plane; and
a switch locking structure comprising a push button assembly and a press button assembly, the push button assembly and the press button assembly being positioned adjacent to the first and second recess respectively, the push button assembly being capable of moving in a first direction which is generally parallel to the swing plane, the press button assembly being capable of moving in a second direction which is generally perpendicular to the swing plane, and
wherein the switch locking structure further comprises a first resilient element and a second resilient element which is perpendicular to the first resilient element, the push button assembly and the press button assembly being capable of moving reciprocatingly under the action of the first resilient element and the second resilient element respectively, the push button assembly being formed with a locking protrusion, and the press button assembly being formed with a drive arm for triggering a switch of the palm power tool and a locking slot for embedding the locking protrusion.

9. The palm jig saw according to claim 8, wherein the output shaft of the motor is generally parallel to the swing plane.

10. The palm jig saw according to claim 8, wherein the push button assembly comprises a push button and a locking block fixedly connected to the push button, the push button being fixedly connected to one end of the first resilient element, and the locking block being formed with the locking protrusion.

11. The palm jig saw according to claim 10, wherein the push button comprises a push button linkage and a push button cap which are integrated, the push button linkage is fixedly connected to the locking block at one end, the push button cap being located at the other end of the push button linkage, the push button cap being formed with a recessed push button contact surface on an outer surface to facilitate manual operation, the push button linkage being formed with a placement opening for receiving and fixing one end of the first resilient element.

12. The palm jig saw according to claim 11, wherein the locking block is threadedly connected to the push button to form a fixed connection.

13. The palm jig saw according to claim 12, wherein palm jig saw further comprises a push button stopper fixedly connected to a machine body of the palm power tool; the first resilient element is a helical spring with one end disposed in the placement opening, and the other end is fixedly connected to the push button stopper.

14. The palm jig saw according to claim 13, wherein the press button assembly comprises a press button and a drive block fixedly connected to the press button, the drive block being formed with the locking slot and the drive arm, the drive arm being provided with a contact ramp and a contact plane which are contiguous to each other.

15. The palm jig saw according to claim 14, wherein the press button comprises a press button linkage and a press button cap which are integrated, the press button linkage being fixedly connected to the drive block at one end, the press button cap being located at the other end of the press button linkage, the press button cap is formed with a press button contact surface for facilitating manual contact on an outer surface, the press button cap is formed with a press button groove in an inner surface for receiving the second resilient element, the second resilient element is fixed in the press button groove at one end.

16. The palm jig saw according to claim 15, wherein the drive block is a hollow sleeve structure which extends to form a semi-circumferential projection at one end, the locking slot is formed on the projection, and a side wall of the sleeve structure extends outwardly to form the drive arm.

17. The palm jig saw according to claim 16, wherein the press button is threadedly connected to the drive block to form a fixed connection.

18. The palm jig saw according to claim 17, wherein the palm jig saw further comprises a press button baffle fixedly connected to the machine body of the palm power tool, the press button linkage running through a through hole on the press button baffle, the second resilient element being a helical spring which is disposed around the press button linkage and which one end is fixed in the press button groove, and the other end thereof is fixed on outside of the press button baffle; the press button groove is an annular groove.

* * * * *